(12) United States Patent
Hancock et al.

(10) Patent No.: US 7,176,933 B2
(45) Date of Patent: Feb. 13, 2007

(54) TEXTURE BASED METHOD AND SYSTEM FOR THE ANTI-ALIASING OF LINES AND CHARACTERS

(75) Inventors: William R. Hancock, Phoenix, AZ (US); Neal P. Countryman, Ft. Collins, CO (US)

(73) Assignee: Honeywell International, Inc., Morristown, NJ (US)

( * ) Notice: Subject to any disclaimer, the term of this patent is extended or adjusted under 35 U.S.C. 154(b) by 83 days.

(21) Appl. No.: 10/851,972

(22) Filed: May 20, 2004

(65) Prior Publication Data

US 2004/0233210 A1 Nov. 25, 2004

Related U.S. Application Data

(60) Provisional application No. 60/472,335, filed on May 20, 2003.

(51) Int. Cl.
*G09G 5/00* (2006.01)
(52) U.S. Cl. ................ 345/582; 345/611; 345/469; 345/469.1; 345/619
(58) Field of Classification Search ........ 345/582–589, 345/426–428, 636, 611, 552, 619
See application file for complete search history.

(56) References Cited

U.S. PATENT DOCUMENTS

| | | | |
|---|---|---|---|
| 5,224,208 A | 6/1993 | Miller, Jr. et al. | |
| 5,264,838 A | 11/1993 | Johnson et al. | |
| 5,339,092 A | 8/1994 | Johnson et al. | |
| 5,381,519 A | 1/1995 | Brown et al. | |
| 5,461,706 A | 10/1995 | Trow et al. | |
| 5,579,456 A | 11/1996 | Cosman | |
| 5,585,863 A * | 12/1996 | Hackett et al. | ............. 348/716 |

(Continued)

FOREIGN PATENT DOCUMENTS

EP 1074938 A2 2/2001

(Continued)

OTHER PUBLICATIONS

McNamara, Robert et al., "Prefiltered Antialiased Lines Using Half-Plane Distance Functions," Proceedings 2000 Siggraph/Eurographics Workshop on Graphics Hardware, Interlaken, Switzerland, Aug. 21-22, 2000, pp. 77-85, Published in 2000.*

*Primary Examiner*—Mark Zimmerman
*Assistant Examiner*—Jwalant Amin
(74) *Attorney, Agent, or Firm*—Ingrassia Fisher & Loren

(57) ABSTRACT

A method for generating anti-aliased lines and characters is disclosed. The method comprises generating a texture map based on a distribution and applying the texture map to a polygonal region. In one aspect of this embodiment, the step of generating a texture map based on a distribution further comprises generating a texture map comprising a series of concentric half circles. In the texture map, the concentric half circles represent a decreasing intensity as the radius of the concentric half circle increases. Additionally, in one embodiment, the texture map is generated using a Gaussian distribution. In another aspect of this embodiment, for each texel in a texture map defining a character, the smallest distance between a texel and each line segment that forms a character is calculated. The smallest distance is used to determine an intensity value using the distribution. Then, the texel is associated with the intensity value to form a texture map for the character. Optionally, a halo value for each texel value can be determined by using the smallest distance found in conjunction with a second distribution to determine a halo value for each texel. This method can be repeated for each character to be displayed.

16 Claims, 9 Drawing Sheets

U.S. PATENT DOCUMENTS

| | | |
|---|---|---|
| 5,596,692 A | 1/1997 | Martin et al. |
| 5,687,304 A * | 11/1997 | Kiss .......................... 345/419 |
| 6,219,025 B1 | 4/2001 | Hill et al. |
| 6,377,262 B1 | 4/2002 | Hitchcock et al. |
| 6,518,968 B1 | 2/2003 | Ritter et al. |
| 6,577,291 B2 | 6/2003 | Hill et al. |
| 6,606,089 B1 | 8/2003 | Margadant |
| 2004/0180453 A1 | 9/2004 | Horton et al. |
| 2004/0263516 A1 | 12/2004 | Michail et al. |

FOREIGN PATENT DOCUMENTS

| WO | WO-99/45502 | * | 9/1999 |
|---|---|---|---|

* cited by examiner

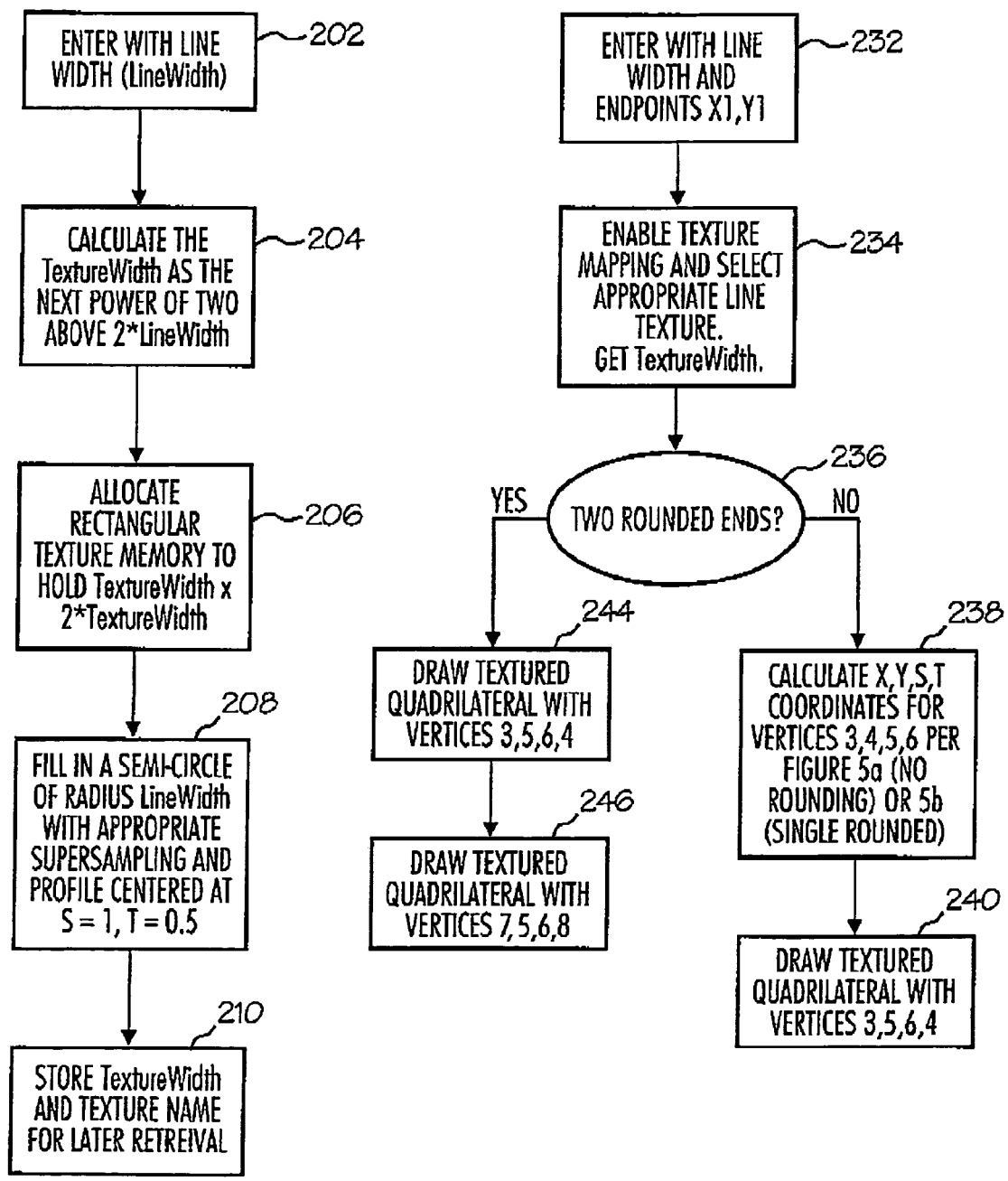

TEXTURE BASED METHOD AND SYSTEM FOR THE ANTI-ALIASING OF LINES AND CHARACTERS

CROSS REFERENCE TO RELATED APPLICATIONS

This application claims the benefit of provisional application No. 60/472,335 filed on May 20, 2003.

TECHNICAL FIELD OF THE INVENTION

This invention relates to the field of computer generated graphics and, more particularly, to a texture based method and system for the anti-aliasing of lines and characters.

BACKGROUND OF THE INVENTION

In many fields of endeavor, it is important that an operator of complex machinery has a reliable visual feedback device. Typically, these feedback devices are display monitors and can be implemented using cathode ray tube (CRT) displays, LCD displays, plasma displays and the like. In the past, the images for these displays were typically generated by proprietary graphic processing units running proprietary image generation software.

Recently, in an effort to decrease costs and to ensure the availability of replacement parts, proprietary graphic processing units and display systems have been replaced with commercial off the shelf (COTS) graphic processing units (GPUs) to generate the images on the display. A drawback of the COTS GPUs is that the COTS GPUs produce less esthetically pleasing lines as compared to previous proprietary systems. This is because the COTS GPUs typically produce a line on a display screen by using a percent coverage calculation. That is, the center of the line is drawn at 100% intensity. On either side of the center of the line, the line is drawn at a lower intensity based on the percentage coverage of each outlying pixel, the intensity decreasing at some percent of intensity, such as 50% intensity. This continues the entire length of the line. The result is lines with relatively coarse anti-aliasing. What is needed is a better method and system for the anti-aliasing of lines and characters.

SUMMARY OF THE INVENTION

In one embodiment of the invention, a method for displaying non-aliased lines on a graphical display is disclosed. The method comprises the steps of generating a texture map based on a symmetrical distribution, using a portion of the texture map to form part of the line and using the entire texture map to form the endpoints of the line.

In another embodiment, the method further comprises the step of generating a texture map comprising a series of concentric half circles. In the texture map, the concentric half circles represent a decreasing intensity as the size of the radius of the concentric half circle increases. Additionally, in one embodiment, the intensity represented by the half circles decreases according to a Gaussian distribution.

In another embodiment, a method for generating anti-aliased lines and characters is disclosed. The method comprises generating a texture map based on a distribution; and applying the texture map to a polygonal region.

In one aspect of this embodiment, the step of generating a texture map based on a distribution further comprises generating a texture map comprising a series of concentric half circles. In the texture map, the concentric half circles represent decreasing intensity as the radius of the concentric half circle increases. Additionally, in one embodiment, the texture map based is generated using a Gaussian distribution.

In another aspect of this embodiment, for each texel in a texture map, the smallest distance between a texel and each line segment that forms a character is calculated. The smallest distance is used to determine an intensity value using the intensity for that distance as determined from a symmetrical distribution. Then, the texel associated with the intensity value is used to form a texture map. Optionally, a halo value for each texel value can be determined by using the smallest distance found in conjunction with a second distribution to determine a halo value for each texel. This method can be repeated for each character to be displayed.

BRIEF DESCRIPTION OF THE DRAWINGS

The present invention will hereinafter be described in conjunction with the following drawing figures, wherein like numerals denote like elements, and:

FIG. 2a and FIG. 2b are flowcharts of an exemplary method to produce textures and then use that texture to draw lines in accordance with the teachings of the present invention;

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The various methods of the present invention can be coded using any programming language and the teachings of the present invention is applicable to any computer language and/or program interface. In a preferred embodiment, the well known OPENGL graphical application program interface is used.

In one embodiment of the present invention a method for drawing lines on a display that does not have aliasing artifacts is provided. In the method of the present invention, a texture map comprising a series of concentric half circles is generated for each line width. The intensity that each of the arcs that comprise the half circles represent decreases according to a symmetrical distribution, such as a Gaussian or normal distribution, as the radius of the arcs increases. The texture map is then mapped to the line. In this fashion, the intensity of the line will decrease from the center of the line outwards, following the symmetrical distribution.

Figure 1:
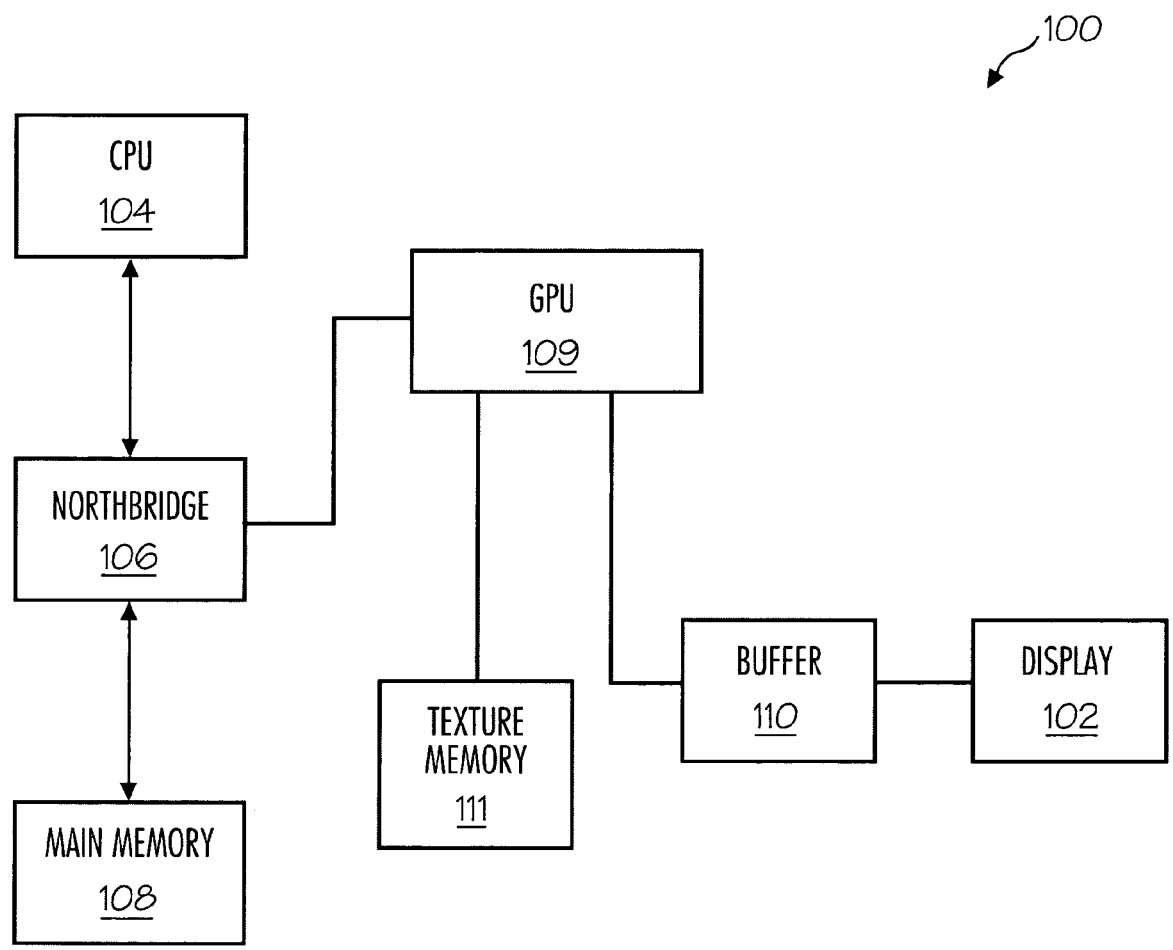
FIG. 1 is a block diagram illustrating a exemplary graphic system for use with the present invention.

With reference to FIGS. 1–3, in one embodiment of the present invention, straight lines are to be displayed on a display 102 of display system 100. Display system 100 can be used in any environment where graphical and/or textual information needs to be displayed to a user or operator. In one embodiment, display system 100 is used in an aircraft and display 102 displays flight information such as a graphical representation of the attitude of the aircraft. For example, a straight horizontal line can represent a level aircraft, while a slanted line can represent a banking aircraft.

Display system 100 also includes a central processing unit 104, coupled to a memory arbitrator such as a Northbridge interface 106 that couples to a main memory 108 and a graphical processing unit 109. Graphical processing unit 109 couples to the display 102 via a frame buffer 110.

Central processing unit (CPU) 104, in one embodiment, receives data from various subsystems, such as altitude sensors in an aircraft embodiment, and, among other tasks, prepares the data for presentation to the graphical processing unit. Suitable CPUs 104 are well known in the art and available commercially from manufacturers such as Intel Corporation of San Jose, Calif.

Main memory 108 stores data and computer programs needed by and to be executed on CPU 104 and graphical processing unit 109. Main memory 108 can be implanted in any standard manner, such as random access memory (RAM), read only memory (ROM), flash memory, and the like. It is well known in the art that various memory components can be mixed and matched and final design choice is readily made by one of skill in the art. Memory is available from commercial suppliers, such as Micron of Boise, Idaho.

Graphical processing unit 109 receives data to be displayed from the CPU 104 and generates the commands used to drive display 102. Graphical processing unit 109 executes software routines stored in main memory 108 to generate the commands to drive display 102. CPU 104 and main memory 108 couple to the CPU 109 via a memory arbitrator such as the Northbridge interface 106. Northbridge interface 106 provides an interface between CPU 104, main memory 108 and the GPU 109 (via an advance graphic port or similar graphic port).

Additionally, in the present invention, graphical processing unit 109 receives data from a texture memory 111 in the form of texture maps to perform texture mapping to form lines and characters as will be discussed in greater detail below. GPUs 109 are commercially available and manufactured by many companies including NVIDIA of Santa Clara, Calif. Northbridge interfaces 106 are known in the art and available from manufacturers such as Intel Corporation of San Jose, Calif. Texture memory 111 can be any type of memory capable of storing texture mappings such as RAM, flash memory, and the like.

As discussed previously, it is the use of commercial off the shelf GPUs that results in aliasing of lines and characters in display systems. The aliasing tends to be more pronounced in lower resolution displays (e.g. 120 dots per inch or less) but the teachings of the present invention are applicable to displays of any resolution. Commercially available GPUs typically draw lines as one full intensity center region (all pixels completely covered by the line) with regions of decreasing intensity in the outlying pixels on either side of the center region. The intensity of these outlying pixels reflects the percentage coverage of the line of each outlying pixel. For example, if a horizontal line with a width of 1.5 pixels is drawn centered in a pixel row, then all pixels inside that pixel row for the length of the line are fully covered and are drawn with full intensity. The pixels immediately above and below this center row are ¼ covered by the line and they are intensified at 25% of the center. This coarse change in intensity leads to block edges or aliasing. To avoid the aliasing of lines, in the present invention, texture mapping is used to draw lines such that line edges gradually transition from bright to dark across multiple outlying pixels.

An exemplary method of producing anti-aliased lines, in accordance with the teachings of the present invention is shown in FIGS. 2a–2b. FIGS. 2a–2b are flowcharts illustrating one embodiment of a method to generate anti-aliased lines in accordance with the teachings of the present invention. The process involves two stages. The first stage initializes the texture memory for each line width required by the system as seen in FIG. 2a. The second stage then draws individual lines based on the repertoire of line widths available as seen in FIG. 2b.

Referring to FIG. 2a, in step 202, the number of lines that can be displayed on the display is selected. For example, in one embodiment, line widths of 16 mils, 19 mils, 28 mils, and 42 mils may be used. These widths are used for exemplary purposes only; any line width or series of line widths can be chosen. Typically, the thicknesses are chosen when designing the information that will be displayed.

Then, in step 204, for each line width, a texture width for the texture map is calculated from the line width. The texture width is equal to the next power of two above the line width. For example, if the line width is 0.02 inches then the texture width is at least 0.02 inches. The texture width is the vertical axis (s-axis) of the texture map. The texture length is twice the texture width and is the horizontal axis (t-axis). Thus, the horizontal axis (t-axis) will be twice as large as the vertical axis (s-axis). For each texture map, a space in the texture memory the size of the texture width by twice the texture width is allocated (step 206).

Figure 3A:
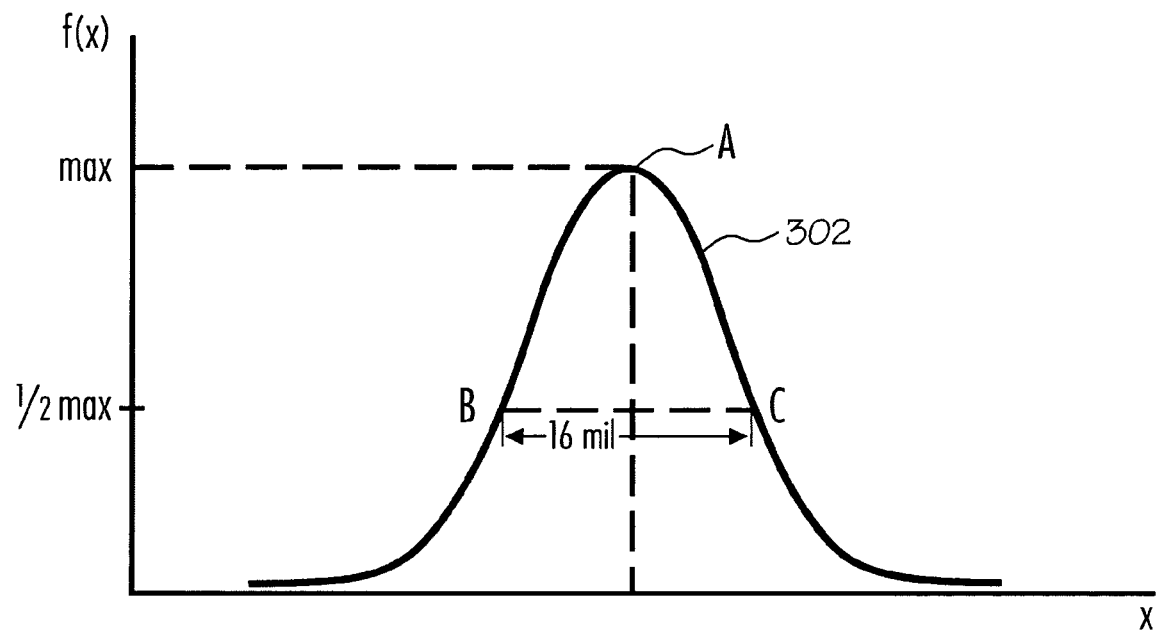
FIGS. 3a–3b illustrate exemplary Gaussian distributions.

Next, in step 208, a texture map is created for each line width. In an exemplary embodiment, each texture map comprises a series of concentric half circles with each half circle representing a decreasing intensity; the intensity decreasing as the radius of the half circle is increasing. The decrease in intensity follows a symmetric distribution curve. The distribution curve typically is drawn such that the half intensity point is reached at a distance that correlates to one half the line width. In one embodiment, intensity decreases in accordance with a Gaussian distribution, although other symmetrical distribution curves can be used. In FIG. 3a, a Gaussian curve 302 is shown. The Gaussian curve is generated by the formula:

$$f(x) = \frac{1}{\sigma\sqrt{2\pi}} e^{-(x-\mu)^2/2\sigma^2}$$

Where e is the transcendental number 2.71828 . . . , π is the transcendental number 3.14159 . . . , μ is the location parameter, σ is the scale parameter (in statistics, μ is called the mean and σ is called the standard deviation).

Note that in Gaussian curve 302, as seen in FIG. 3a, the largest value, A, which represents the greatest intensity, is at the center of the distribution. The intensity falls off on either side of the central value A. The Gaussian curve 302, in the present invention, can be used to model a desired appearance for a line. The center of the line will be the most intense part of the line and the intensity of the line, on either side of the center part, will decrease in accordance with a gaussian distribution. The smooth, symmetrical fall off of the Gaussian curve allows for smooth fallout in the appearance of the line, eliminating aliasing effects.

Figure 3B:
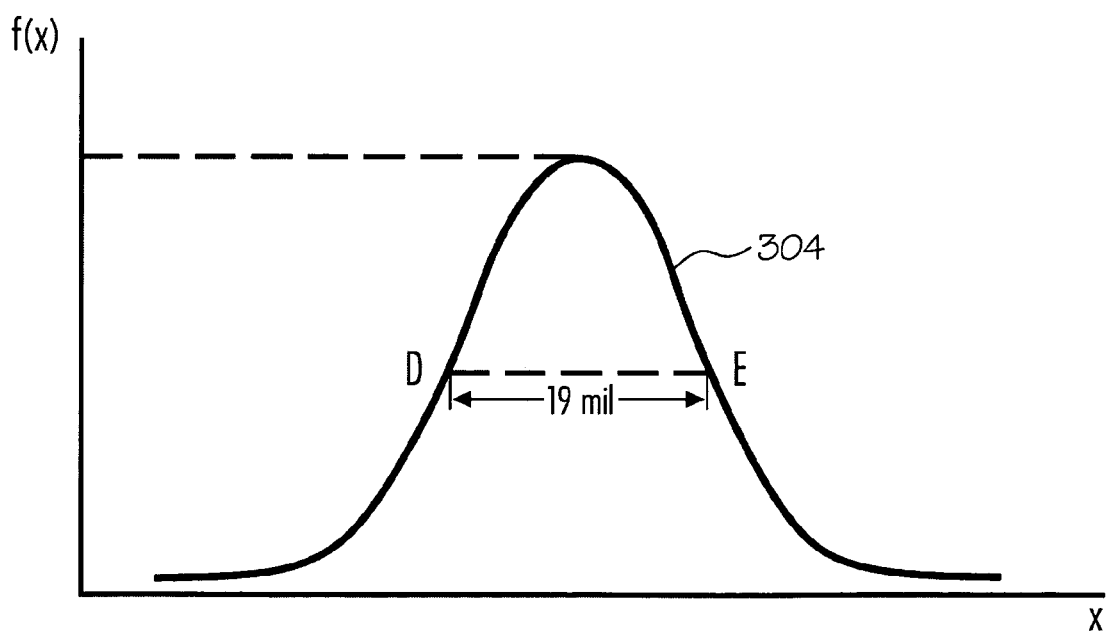

In one embodiment, the Gaussian curve 302 as seen in FIG. 3a is used for a 16 mil line. For a 16 mil line there is the equivalent of 16 mil of separation in the texture map space between the fifty percent points, that is, the point where the f(x) value is half its maximum value as illustrated by point B and point C on Gaussian curve 302. FIG. 3b illustrates a Gaussian curve 304 for a 19 mil line. Gaussian curve 304 has the equivalent of 19 mil of separation between the fifty percent points. This is illustrated on Gaussian curve 304 in FIG. 3b, where there is the equivalent of 19 mils of separation between point D and point E on Gaussian curve 304, where point D and point E are the fifty percent points.

Figure 4:
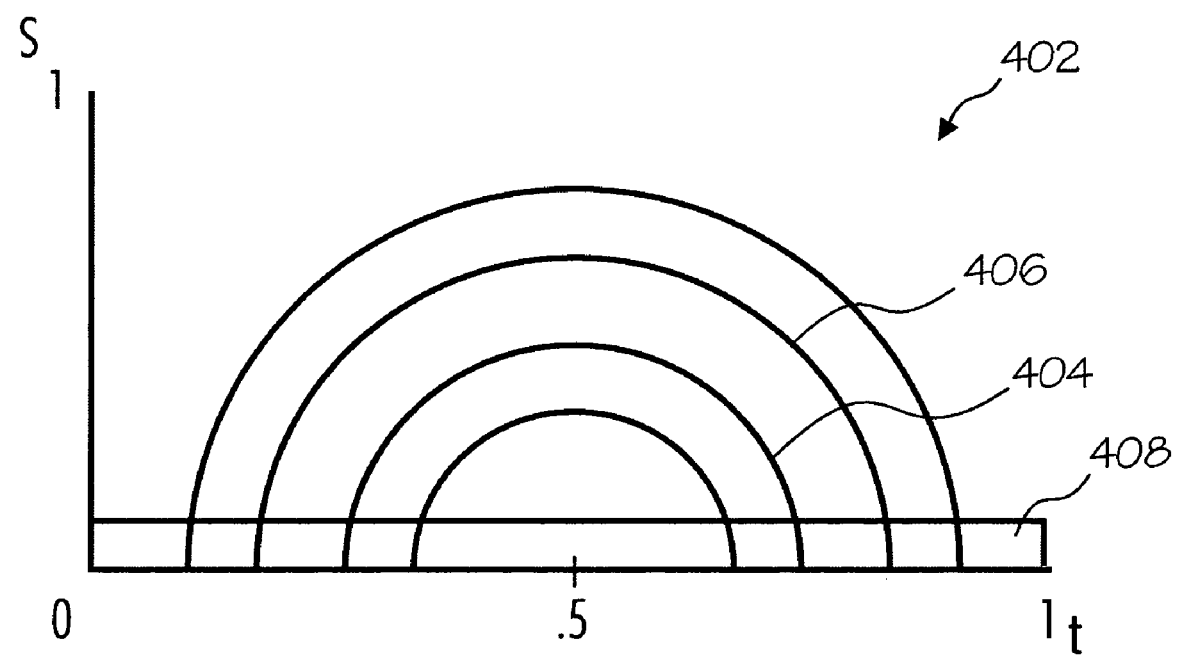
FIG. 4 illustrates an exemplary texture map for generating anti-aliased lines.

FIG. 4 illustrates a texture map 402 generated for a 16 mil line using a Gaussian distribution. In one embodiment, texture map 402 comprises a series of concentric half circles with each half circle representing a certain intensity. The larger the radius of the half circle, the lower the intensity the half circle represents. As discussed previously, in one embodiment, the intensity falls off based on a Gaussian distribution. For example, the exemplary texture map 402 is based on the Gaussian distribution shown in FIG. 3a. As seen in FIG. 4, a first curve 404 represents a certain intensity. For example, in an embodiment where FF hex represents the highest intensity and 0 hex represents the lowest intensity, first curve 404 may have an intensity of 80 hex. A second curve 406, having a large radius, can represent an intensity of 40 hex. The points between these two curves uniformly transition between the two values. Therefore, as the radius of the semis circle increases, the intensity value that semicircle represents decreases. In one embodiment, there are different texture maps for each different line width that can be used. The different texture maps are stored in texture memory 111, in step 210.

In one embodiment, the semicircles are drawn within a semicircle having a radius of the line width. As seen in FIG. 4, the horizontal axis is the t-axis and the vertical axis is the s-axis. The profile of the texture map is centered at s=1 and t=0.5.

Referring now to FIG. 2b, once the texture map 402 is generated, the texture map 402 can be used to generate anti-aliased lines. First, the line width and the endpoints of the line to be calculated are given in step 232. Then, texture mapping is enabled and the appropriate line texture for the line size is selected (step 234). Also, in this step the texture width for the given texture is received. In one embodiment, lines can be drawn with two endpoints that are rounded, with one endpoint that is rounded or with no endpoints that are rounded endpoints. Rounded endpoints to a line tend to make lines look more even and have anti-aliased edges but are also somewhat more complex to draw. In step 236, the choice between using two rounded or a single/non-rounded ends for the line is made.

Figure 5A:
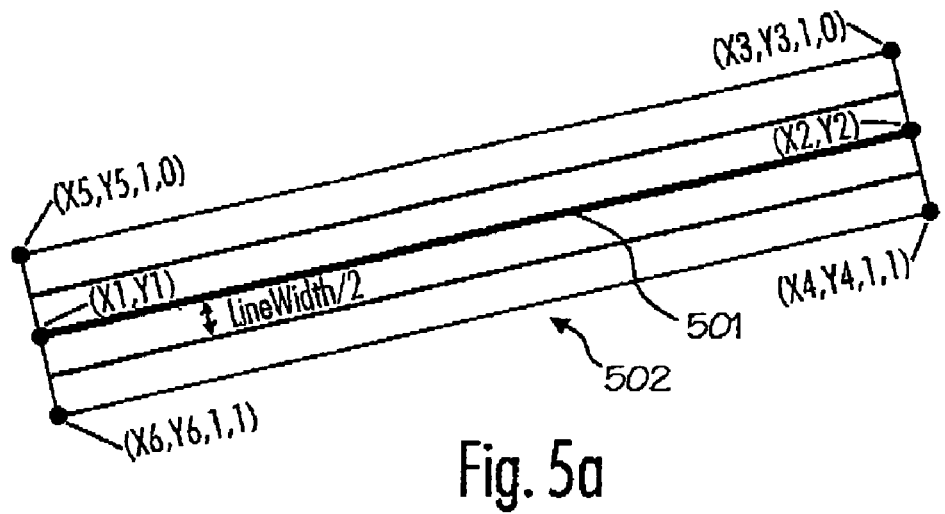
FIG. 5a and FIG. 5b illustrates exemplary line formed in accordance with the teachings of the present invention.

If non-rounded ends are used, only the bottom row of the texture map is mapped to form a line. The bottom row of the texture map is shown as box 408 of FIG. 4 and extends one texel in the s axis and across the entire t axis (a texel is the texture space equivalent of a pixel). In FIG. 5a, an exemplary line 502 having the texture map applied is illustrated. The line will be drawn from endpoints (X1, Y1) to (X2, Y2). The line is drawn by forming a rectangle which longitudinally bisects the center of the line between (X1,Y1) and (X2,Y2). The corner coordinates of that rectangle are specified in FIG. 5a in the form of X,Y,S,T, where X and Y are the Cartesian coordinates of the corners of the line in the display space and S and T are the Cartesian coordinates of the texture map as applied to the line 502. Note that the T coordinate varies from 0 to 1 perpendicular to the line and S is set to a constant of 1.0 parallel to the line. This results in the last row of texels of the texture map (at S=1) to be stretched across the entire length of the line. In the OPENGL nomenclature, this is refereed to as texture edge clamping. The center of the line will be at full intensity and the pixels at half the line width from the center will be at half intensity. The S and T coordinates of each pixel within the rectangular area are calculated to be at the same relative offset within the rectangle in both X, Y and S, T (step 238). However, because the S coordinates are the same at both ends of the rectangle, all pixels will have the same S value (the S value does not change). The T coordinate, meanwhile, will transition from 0 to 1 along the width of the line 502.

Note, that at the center of the line 502, the center of the texture map where T=0.5 and S=1 will be mapped. The texture map 402 is at full intensity at T=0.5 and S=1. At T=0 and T=1, the intensity of the texture map 402 is zero, so the equivalent location on line 502 will be at or near zero intensity. Pixels that are half a line width offset from the center of the line 502 will have the portion of texture map 402 where T=0.25 or T=0.75. The intensity of the texture map at T=0.25 or T=0.75 represents a 50% intensity. In other words, the center of the texture map 402 is mapped to the center 501 of the line 502 and the ends of the texture map 402, where the intensity approaches or is at zero intensity, maps to the ends of the width of the line 502 (step 240). The exact process used to perform a texture map is well known in the art. For example, texture mapping is generally discussed in *Introduction to Computer Graphics*, by J. D. Foley, A. van Dam, S. K. Feiner, J. F. Hughes, and R. L. Philips, Addison-Wesley, 1994. This text is hereby incorporated by reference. It is preferable to use oversampling to produce the lines. Oversampling uses multiple texels to map to each pixel. In one embodiment, a four by four array of texels are mapped to each pixel in the display space, for 16 times oversampling. Other levels of oversampling can be used or no oversampling can be used.

Figure 5B:
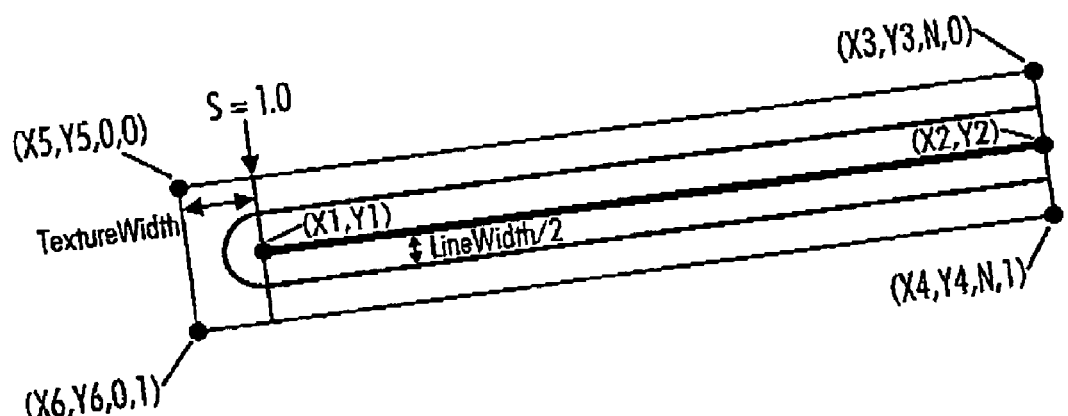

A line that has a single rounded edge can also be drawn with a single textured rectangle. In this embodiment, the rectangle is again bisected by the center line but is extended on one edge to enclose the rounded edge as seen in FIG. 5b. The textured rectangle is then drawn with S=0 at the rounded end to S=N at the non-rounded end. N is calculated such that S=1 at the perpendicular to the line through (X1,Y1). This results in an endcap (rounded end) being rendered into the small extension rectangle to the left of the first endpoint by mapping the entire texture map for the rectangle where S=0 to S=1. Then the last row (S=1) of the texture map 402 is then repeated across the length of the line from (X1, Y1) to (X2, Y2). Note that the texture mode must be set to "clamp" (or repeat) the edge texels (where S=1 and T=0 to 1) rather than repeating the full texture. With texture edge clamping, all texels between S=1 and S=N are mapped to the S=1 texels. The T coordinates work the same as described for the non-rounded case. Note that the other end (X2,Y2) can be rounded simply by switching the two coordinates (draw from X2,Y2 to X1,Y1).

Figure 6:
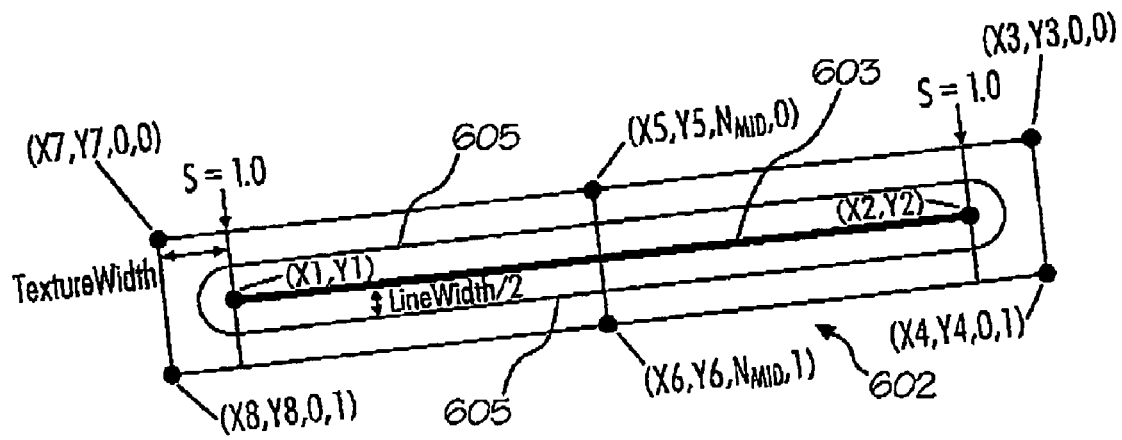
FIG. 6 illustrates an alternative exemplary line formed in accordance with the teachings of the present invention.

If the line is to have two rounded edges, then line 602 can be comprised of two quadrilaterals as shown in FIG. 6. The simplest method to draw line 602 is to bisect the line and draw two equal sized rectangles (such as the two quadrilaterals). However, the exemplary method works if the line 602 is divided at any one point along the length of the line 602.

For example, the full line can be drawn with a single endcap as described above, and then a second rectangle then can be drawn to just render the second endcap. The advantage of bisecting the line and using two equal quadrilaterals is that the S and T coordinates are the same for both rectangles, which enables a single triangle mesh to render both rectangles. Starting at the midpoint of the line to be drawn, the portion of texture map 402 comprising the first row of the texture map 402 is mapped from the midpoint, labeled $N_{MID}$ ($S=N_{MID}$), in FIG. 6, to the point of the line labeled (S=1). In step 244, from the point S=1 to S=0, the entire texture map is used to draw the end of the line. Since the texture map is a series of concentric half circles representing decreasing intensity, the end of the lines will appear as a semicircle with decreasing intensity. Once one half of the line is drawn, the other half, from the midpoint of the line to the other end is drawn in step 246.

As an example, in the line shown in FIG. 6, the distance from the center 603 of the line 602 to the half intensity point 605 of the line 602 is half the line width. The half point intensity point 605 of line 602 is where the intensity of the line is half the maximum intensity. It is not the total width of line 602, which continues past the half intensity point 605 with further decreasing intensity. Thus, when the texture map 402 is applied, the point at the middle of the texture map 402 to a point representing the half intensity point of the texture map 402 is mapped from the center of the line to half intensity point 605 of the line. In the example of FIG. 6, the width of the line 602 from center 603 to the half intensity point 605 for an exemplary 16 mil line on a fifteen inch screen set at a 1024 by 768 resolution is approximately 1.35 pixels. This means that from the center of the texture map of FIG. 4, to the fifty percent intensity concentric half circle of FIG. 4 is mapped from the center 603 of the line 602 to the half intensity point 605 of the line 602 (on both sides of the center 603 of the line 602). That is, the distance from the center of the texture map to the fifty percent concentric half circle will extend 1.35 pixels as determined in the line space. Since the texture map comprises concentric half circles, at the midpoint of the line when the whole texture is mapped to the line, which distance from the center 603 to the half intensity point 605 is a radius of a semicircle that extends to fifty percent intensity of the tip of the rounded portion of the end of the line.

To illustrate the calculations involved in determining the vertices as shown in FIG. 5a, 5b and 6, the following equations, with slight changes for the type of line being calculated, can be used. The following equation is for a line having two rounded edges. In the following calculations, X1=1.2, Y1=0.8, X2=1.6, Y2=0.5, Texture Width=0.02.

$$LineLength = \sqrt{(x_2 - x_1)^2 + (y_2 - y_1)^2} = 0.5$$

$$\Delta xx = \frac{TextureWidth * (x_2 - x_1)}{LineLength} = 0.016$$

$$\Delta yy = \frac{TextureWidth * (y_2 - y_1)}{LineLength} = -0.012$$

$$X3 = X2 + \Delta xx - \Delta yy = 1.628$$

$$Y3 = Y2 + \Delta yy + \Delta xx = 0.504$$

$$X4 = X2 + \Delta xx + \Delta yy = 1.604$$

$$Y4 = Y2 + \Delta yy - \Delta xx = 0.472$$

$$X5 = (X2 + X1)/2 - \Delta yy = 1.412$$

-continued $$Y5 = (Y2 + Y1)/2 + \Delta xx = 0.666$$

$$X6 = (X2 + X1)/2 + \Delta yy = 1.388$$

$$Y6 = (Y2 + Y1)/2 - \Delta xx = 0.634$$

$$X7 = X1 - \Delta xx - \Delta yy = 1.196$$

$$Y7 = Y1 - \Delta yy + \Delta xx = 0.828$$

$$X8 = X1 - \Delta xx + \Delta yy = 1.172$$

$$Y8 = Y1 - \Delta yy - \Delta xx = 0.796$$

$$N = 1 + \frac{LineLength}{2 * TextureWidth} = 13.5$$

Where the texture width is the distance from S=1 to 0 in the figure space of FIG. 6. These coordinates form a rectangle centered about the line from X1,Y1 to X2,Y2 appropriately offset to draw the endcaps and textured line. Similar equations can be used to compute the vertices of the non-rounded lines and the vertices of one round edge lines.

The above method to draw a rounded endpoint to a line is for exemplary purposes only and any method to draw a line using the texture mapping as disclosed in the present invention may be used.

Figure 7:
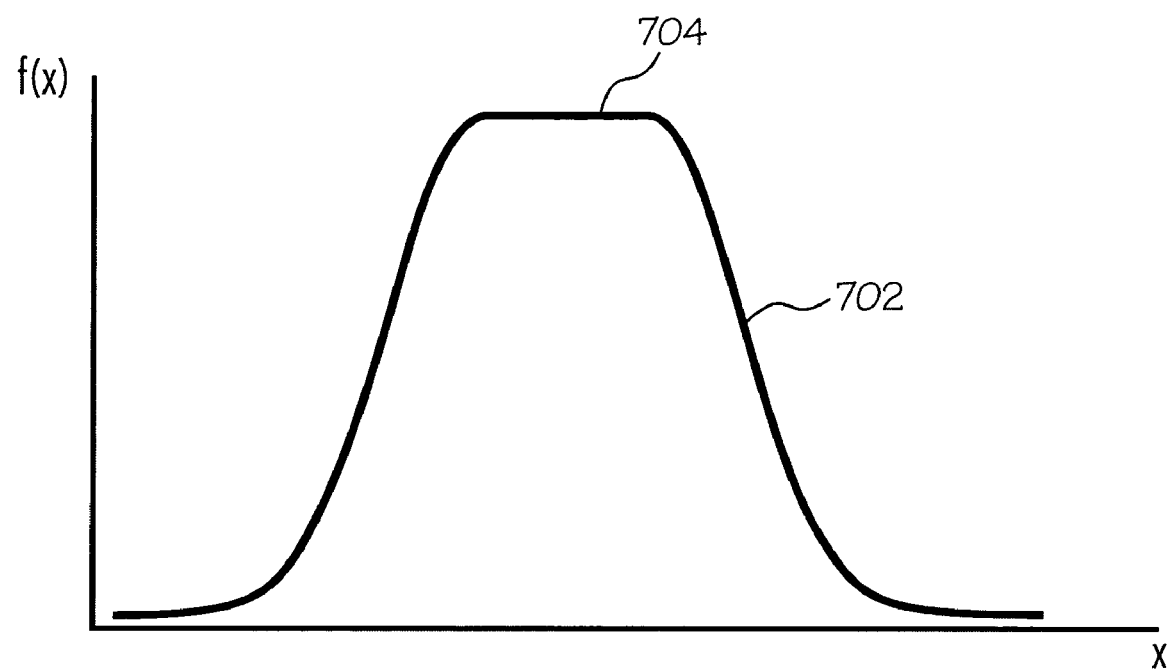
FIG. 7 illustrates an alternative embodiment of the distribution for use in the present invention.

As discussed previously, the texture mapping can be done in any of several well known texture mapping procedures using oversampling techniques when needed. While the above method forms lines that are useable, as the line widths increase, it is often desirable to enhance the intensity of the line before having the intensity drop off according to a symmetrical distribution. As seen in FIG. 7, a modified distribution curve 702 having a plateau region 704 is illustrated. The modified distribution curve 702 can be used to generate a texture map for use in generating a line. In one example, the distribution curve 702 is for a 19 mil line and the plateau region 704 is 3 mil across. This modified distribution curve 702 will produce a line with a 3 mil full intensity center, followed by a fall off in intensity in accordance with the rest of the modified distribution curve 702. This example results in a line width of 22 mils but with more brightness and sharpness than a line drawn with a 22 mil profile.

Full intensity, in one embodiment, is a full white line. If the full white line is to be drawn on a white display, the line would be invisible (this of course, is true for any time the same color line is drawn on the same color display screen). In order to see the line, a halo is first drawn followed by the actual line. A halo is a region of similar shape to the line to be drawn with a larger line width that is drawn in a contrasting color to the line (a black halo for a white line, for example). In the present invention the halo can also be drawn via the method of the present invention. Each line width can have an associated halo width and each halo has an associated texture map. After the halo is drawn, the line can be generated which will appear as a white line in a black cutout. The process then is to write a black line to cut a hole into the bright background and then write the white line (with a narrower line width) into that hole.

The method to draw an anti-aliased line in accordance with the teachings of the present invention can, of course, be used to draw connected lines. Thus, the method of the present invention can be used to draw any arbitrary "stick" type figure of any level of complexity. Additionally, lines can be connected to form alpha numeric characters and symbols. One disadvantage of using connected lines to form alpha-numeric characters is that the characters formed can have a "match stick" like appearance where an endcap overlaps the next line area, resulting in extra brightness at the intersection.

Figure 8:
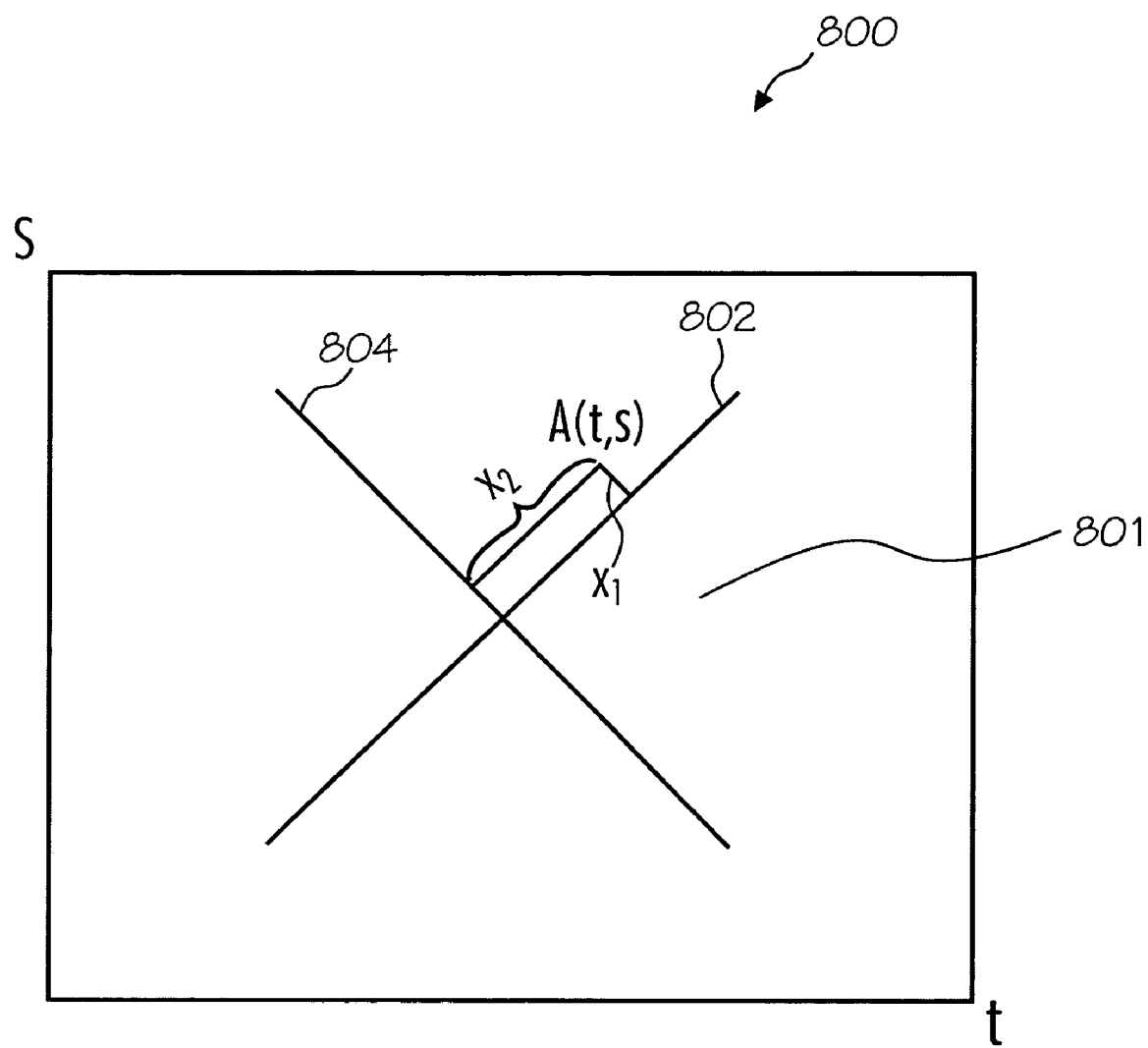
FIG. 8 illustrates a character map for use in generating a line.
Figure 9A:
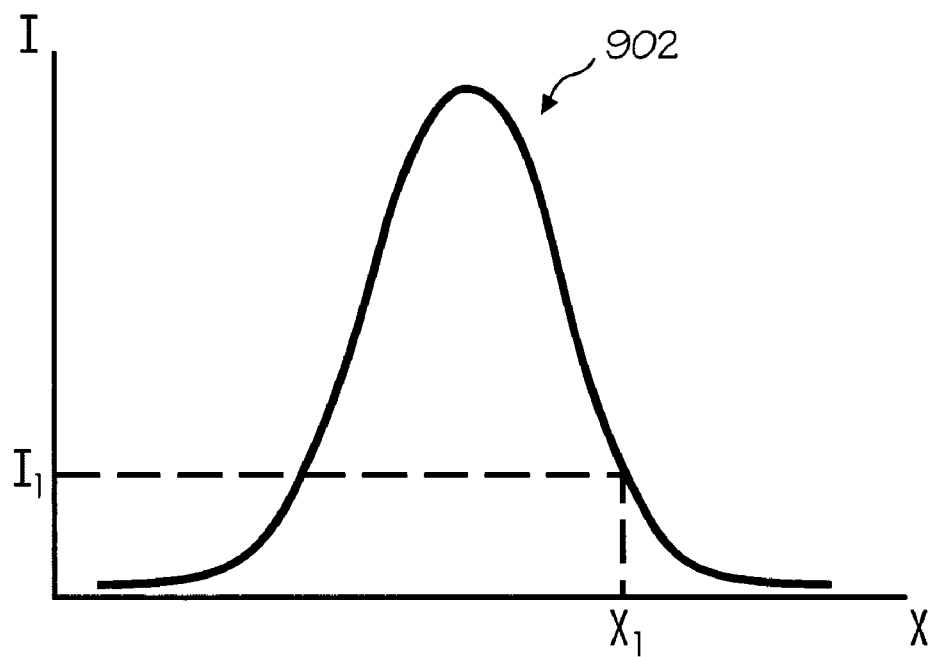
FIGS. 9a and 9b illustrates distributions for luminance and intensity in accordance with the teachings of the present invention.
Figure 9B:
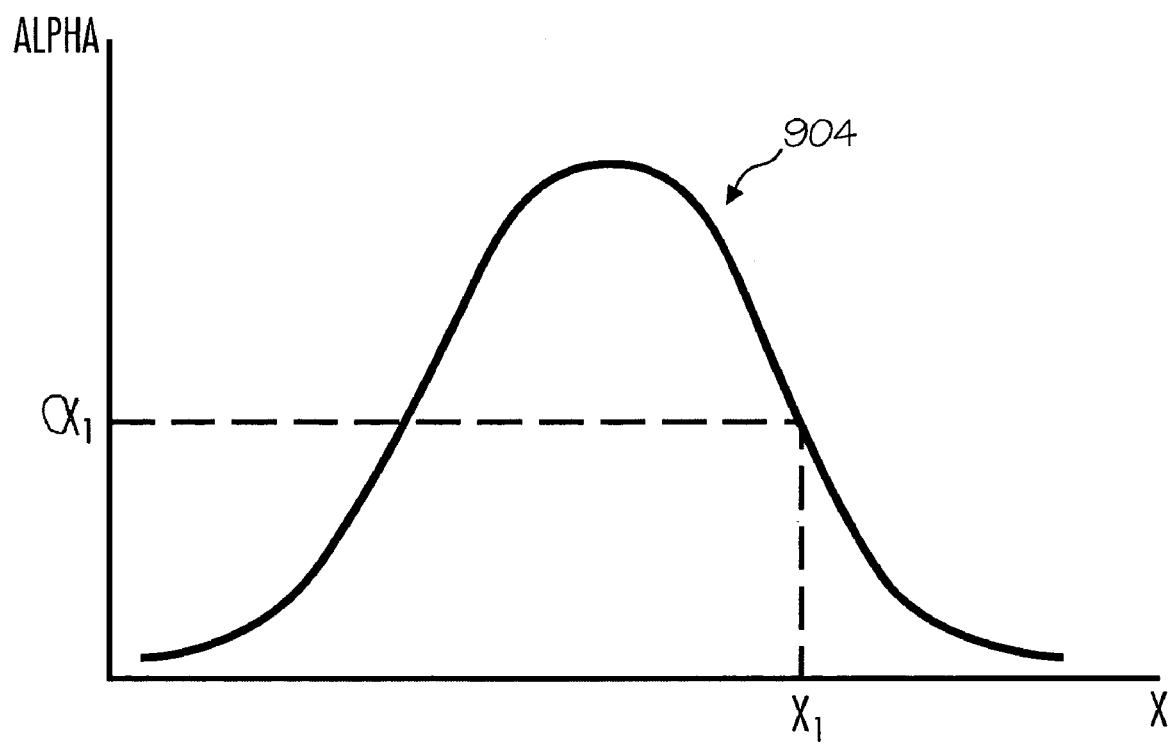
Figure 10:
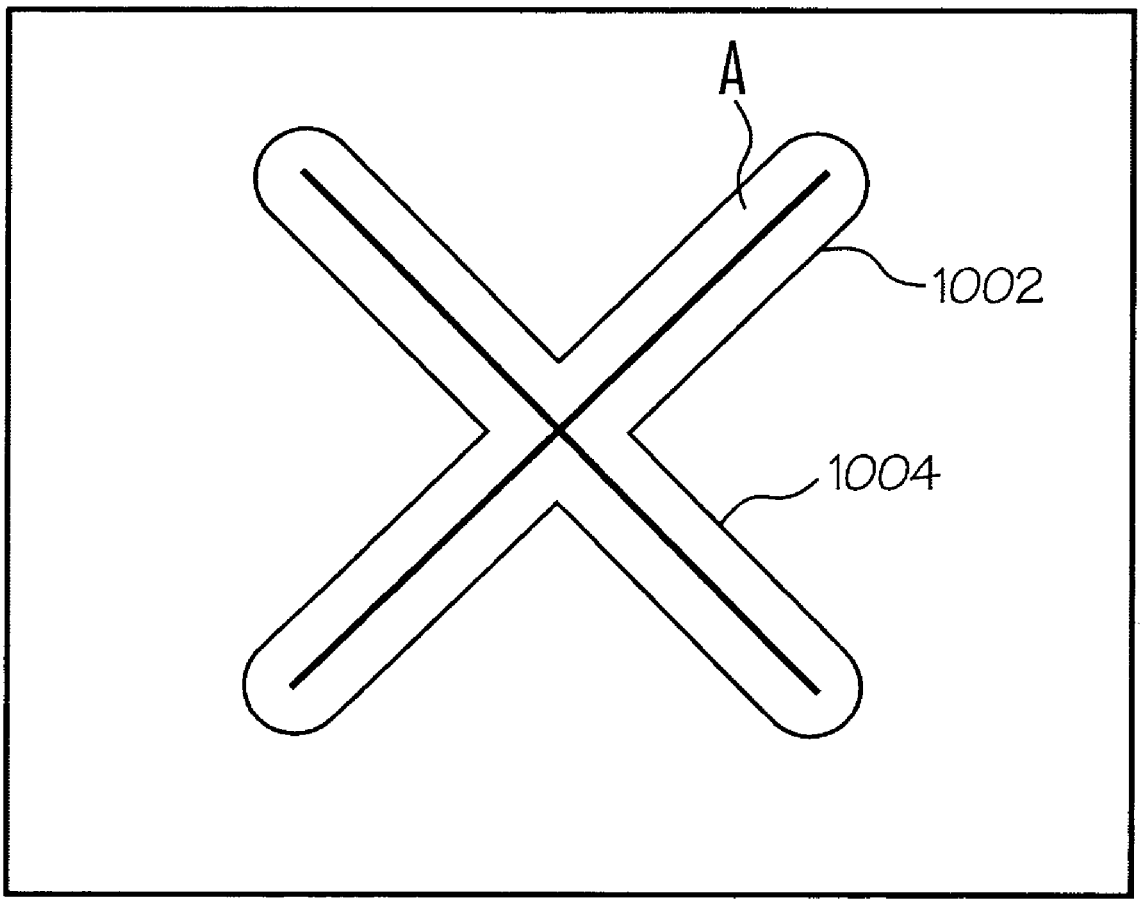
FIG. 10 illustrates an exemplary character texture map.

Another method for forming anti-aliased characters is illustrated in FIGS. 8–10. The method computes a texture map corresponding to each character to be displayed. To start the formation of texture map for a character, the character is drawn on a character map (800) as a series of line segments only, as seen in FIG. 8. In FIG. 8, the letter X 801 is represented by a first line segment 802 and a second line segment 804. For each texel (the equivalent of a pixel in texture space) in FIG. 8, a distance can be calculated from that texel to each line segment in the character. The smallest distance between a texel and a line segment is used in conjunction with a distribution, such as a Gaussian distribution, to determine an intensity value for that texel. If the distance from a texel to a line pair is equal, than either line could be associated with the texel. The intensity would be found as before. The intensity is recorded for each texel.

For example, point A of FIG. 8 (corresponding to point $(t_1, s_1)$) is a distance $x_1$ from line segment 802 and a distance $x_2$ from a line segment 804. In this example, the distance $x_1$ is less than the distance $x_2$. Therefore, the distance $x_1$ will be used to determine the intensity value to be assigned to the texel. The intensity value to be assigned to the texel is found by using a reference distribution such as the Gaussian distribution of FIG. 9.

FIG. 9a illustrates an exemplary Gaussian intensity distribution curve 902 for intensity versus distance from a line. Referring back to FIG. 8, all points lying on the line segments that make up the character will be at a full intensity. In the given example of FIG. 8, the distance between the texel and the line was $x_1$. This distance $x_1$ is located on the x-axis of the intensity distribution curve 902 of FIG. 9a. Reading across finds that for that location the intensity is $I_1$. The texel of the texture map will be assigned this value.

An exemplary character texture map (1000) is shown in FIG. 10. The character 1002 has a full intensity central line with a decreasing intensity on either side of the center line, shown as the dotted outline 1004, similar to the lines described in FIGS. 1–7. The point $(t_1, s_1)$ of FIG. 8 is labeled on FIG. 10 as point A'. In the present invention a texture map is generated for each alphanumeric character or symbol to be displayed. The texture maps are then stored in texture memory 111. The texture maps can be mapped to any polygonal region to produce the character or symbol, as is known in the art.

As discussed in conjunction with the drawing of lines in FIGS. 1–7, to increase visibility of lines against certain backgrounds, a "halo" of a contrasting color is drawn and then the line is drawn within the halo. For example, as was discussed previously, to have a white line visible on a white background, a black halo would be drawn and the white line drawn within the black halo. In the present invention, to display a halo with a character, the halo value for a given texel can be calculated at the same time the intensity value for that halo is calculated. In FIG. 9b a halo distribution curve 904 for the halo intensity is shown. Note that the distribution curve in FIG. 9b spreads out further than the intensity distribution curve 902 of FIG. 9a. This means that at distance from the line where the intensity is very small or non-existent, there is a halo value. This allows for a halo that is wider than the character; that is, the halo will surround the character. In this embodiment, a given texel will store both an intensity value and a halo value. For example, in FIG. 9a the point $x_1$ has an associated intensity value (luminance) of $I_1$. From FIG. 9b, the point $X_1$ has an associated halo value (alpha) of $\alpha_1$. In the nomenclature of "OpenGL™" the halo represents the Alpha value of the texture component and the intensity value represents Luminance.

Characters are drawn with a single textured rectangle appropriately positioned and sized to render the desired character. The texture area containing the desired character then is selected using the T, S coordinates of the texture map. This maps the full character with the desired positioning and scaling. The primary advantages of drawing characters with this method are three-fold. First, the image quality is improved because the intersections are not oversaturated (no matchstick effect). Second, the processing and transmission of vertices are much reduced, because only four vertices are required for the full character rather than four to six vertices per line. Third, much of the work can be done off-line or once after initial power up of the graphical system, thus greatly reducing the run-time calculations required for drawing characters.

Typically one set of characters will be drawn for each line width and halo width desired. Note that larger characters can be created from smaller characters, as long as the line and halo width can be scaled with the total size. Additionally, most applications will "supersample" the textures to more accurately map the profiles in the line edges. For example, the character may appear 4 times as big in texture memory as when it is mapped into its normal size in the frame buffer. Using supersampling in conjunction with interpolation to decimate the image (reduce the size) is well known in the art for producing higher fidelity reproductions. The tradeoff is then between extra memory to save the oversized map and the level of anti-aliasing effectiveness. The inclusion of the halo field in the texture is optional, because the invention works with only alpha (typically 1 byte) per texel as well as alpha/luminance (typically 2 bytes per texel) used for automatic haloing. This means that haloed character must be drawn twice: once with the halo color and a wider line width and a second time with the narrower line width. This doubles the number of character definitions and the number of vertex writes, but may save memory because the halo line width can be used to draw the same character with wider lines and each character is only half the size in texture memory.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A method for generating anti-aliased lines and characters comprising the steps of:
   generating a texture map based on a symmetrical distribution by:
      determining a smallest distance between each texel in the texture map and each line segment that forms a character or a line;
      using the smallest distance to determine an intensity value based on the symmetrical distribution;

associating each texel with the intensity value to form the texture map; and applying the texture map to a polygonal region to form anti-aliased lines and characters.

2. The method of claim 1 wherein the step of generating a texture map based on a symmetrical distribution further comprises generating a texture map comprising a series of concentric half circles, the concentric half circles representing a decreasing intensity.

3. The method of claim 1 wherein the step of generating a texture map based on a distribution further comprises generating a texture map based on a Gaussian distribution.

4. The method of claim 1 wherein the step of generating a texture map based on a distribution further comprises generating a texture map based on a Gaussian distribution with a plateau.

5. The method of claim 1 wherein the step of applying the texture map to a polygonal region further comprises using a first row of a texture map to form part of a line.

6. The method of claim 1 wherein the step of generating a texture map based on a distribution further comprising generating a separate texture map based on a symmetrical distribution for each line width to be displayed.

7. The method of claim 1 further comprising determining a halo value for each texel value by using the smallest distance in conjunction with a second distribution to determine a halo value for each texel.

8. The method of claim 1 further comprising forming a texture map for each character to be displayed.

9. A display system for forming anti-aliased lines and characters comprising:
   a texture memory for storing at least one texture map for each line or character to be displayed, the texture map generated using a symmetrical distribution;
   a graphical processor unit coupled to the texture memory and operable to apply the texture map to a polygonal region to form anti-aliased lines and characters; and
   wherein the graphical processor unit is further operable to determine a smallest distance between each texel in the texture map and each line segment that forms a character or a line, to use the smallest distance to determine an intensity value based on the symmetrical distribution, and to associate the texel with the intensity value to form the texture map.

10. The system of claim 9 wherein the texture map comprises a series of concentric half circles, the concentric half circles representing a decreasing intensity as the radius of the concentric half circle increases.

11. The system of claim 9 wherein the texture map is based on a Gaussian. distribution.

12. The system of claim 9 wherein the texture map is generated using a Gaussian distribution with a plateau region.

13. The system of claim 9 wherein a first row of a texture map is used to form part of a line.

14. The system of claim 9 wherein a separate texture map based on a symmetrical distribution is used for each line width to be displayed.

15. The system of claim 9 wherein the processor is further operable to determine a halo value for each texel value by using the smallest distance in conjunction with a second distribution to determine a halo value for each texel.

16. The system of claim 9 wherein a texture map for each character is formed and stored in the texture memory.

* * * * *